March 23, 1937.  A. P. WOOD  2,074,822
DYNAMO-ELECTRIC MACHINE
Filed Sept. 4, 1935
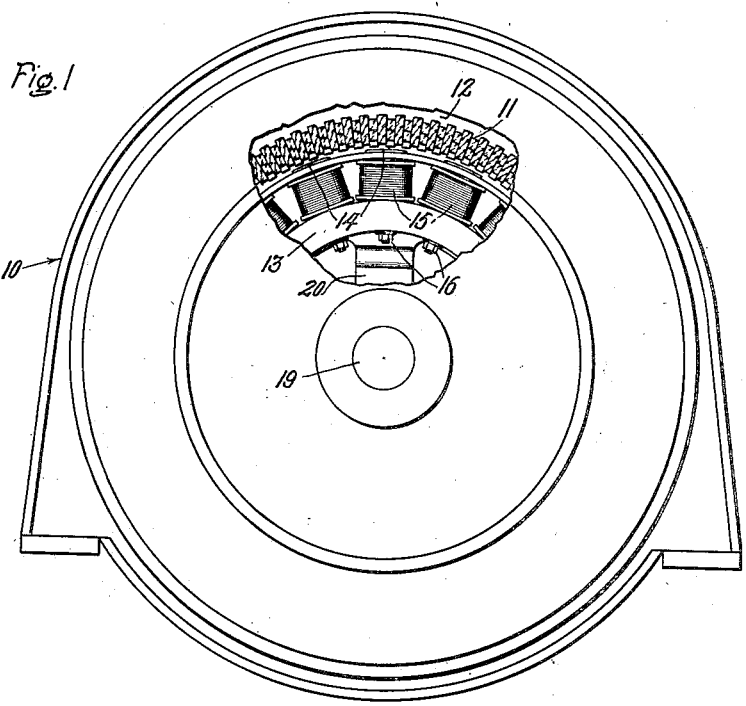
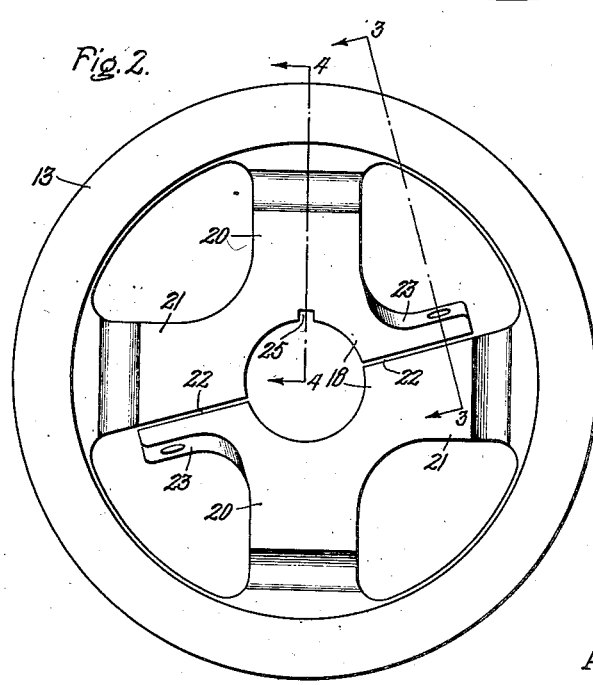
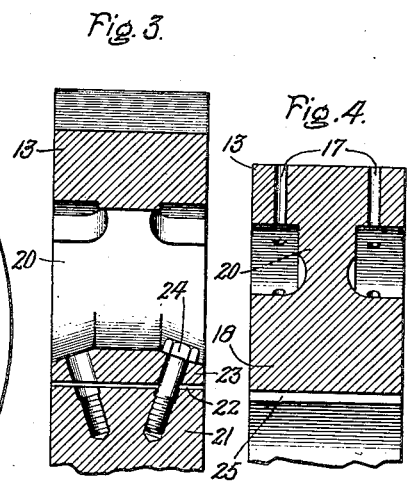
Inventor:
Alexander P. Wood,
by Harry E. Dunham
His Attorney.

Patented Mar. 23, 1937

2,074,822

UNITED STATES PATENT OFFICE 2,074,822

DYNAMO-ELECTRIC MACHINE

Alexander P. Wood, Schenectady, N. Y., assignor to General Electric Company, a corporation of New York Application September 4, 1935, Serial No. 39,106

5 Claims. (Cl. 171—252)

My invention relates to rotors for dynamo-electric machines.

The object of my invention is to provide an improved rotor construction for dynamo-electric machines, which can be readily mounted upon a shaft and then secured rigidly in position.

My invention will be more fully set forth in the following description referring to the accompanying drawing and the features of novelty characterizing my invention will be pointed out with particularity in the claims appended to and forming a part of this specification.

For a better understanding of my invention, reference is made to the accompanying drawing wherein Fig. 1 is an end view of a dynamo-electric machine having a rotor embodying my invention, the frame of which is partly broken away to show the arrangement of the pole pieces mounted on the rotor; Fig. 2 is an end elevation of a rotor of the machine shown in Fig. 1, the pole pieces and shaft being removed; Fig. 3 is a sectional view on the line 3—3 of Fig. 2, illustrating the manner of securing adjacent portions of the divided hub; and Fig. 4 is a sectional view on line 4—4 of Fig. 2.

Referring to the drawing, in Fig. 1 I have shown a dynamo-electric machine having a rotor embodying my invention. This machine includes a stator 10 provided with suitable windings 11, and a core structure 12 supported in the frame of the stator. The rotor comprises an annular rim 13 on which are mounted pole pieces 14 forming the field structure of the dynamo-electric machine. These pole pieces are magnetically excited by field exciting windings 15, and are secured to the annular rim 13 by bolts 16 fitted in a series of holes 17 formed in the annular rim.

The rotor is provided with a diametrically divided segmental hub 18 having an internal diameter larger than the shaft 19 upon which it is mounted. As shown in Fig. 2, rigid spokes or arms 20 and 21 are formed integral with the annular integral rim 13 and two segments of the hub 18. These spokes are preferably integrally connected in pairs by segments of the hub 18, so as to form a more rigid rotor spider structure. I find it desirable and economical to form such a rotor from a single piece of steel from which the metal may be burned by a torch to form the rim, spokes, and hub. After this operation, the axial opening for the shaft is bored in the hub, diametrical slots 22 are cut between sets of spokes, and the exterior surface of the rotor spider is finished by machining. The segments of the hub 18 are secured together by resilient clamping arms 23. These arms are formed integral with the hub segments adjacent the slots 22, and are arranged to be secured by bolts 24 to adjacent rigid spokes 21 carried by adjacent hub segments. The desired clamping pressure is obtained by adjustment of the bolts 24, and relative rotation of the rotor with respect to the shaft is prevented by inserting a key in the keyway 25 and a corresponding keyway on the shaft 19.

Modifications of my invention which I have illustrated and described will occur to those skilled in the art. I desire it to be understood, therefore, that my invention is not to be limited to the particular arrangement disclosed and I intend, in the appended claims, to cover all modifications which do not depart from the spirit and scope of my invention.

What I claim as new and desire to secure by Letters Patent of the United States is:

1. A rotor for dynamo-electric machines including a hub having segments, an annular integral rim, spokes rigidly connecting said hub segments and said annular rim, and means including resilient arms integral with said segments for clamping said segments together.

2. A rotor for dynamo-electric machines including a segmental hub, an annular rim, spokes connecting said hub and said rim, and means including clamping arms formed integral with said hub and secured to spokes carried by adjacent segments of said hub for clamping together said adjacent hub segments.

3. A rotor for dynamo-electric machines including an annular rim, spokes carried by said rim, a segmental hub formed integral with said spokes, a resilient clamping arm carried by a segment of said hub, and means securing together said clamping arm and a spoke on an adjacent segment of said hub for clamping together said adjacent segments of said hub.

4. A rotor for dynamo-electric machines having a hub formed with a slot therein, a resilient clamping arm formed integral with said hub adjacent said slot, spokes rigidly carried by said hub, means securing together said resilient clamping arm and an adjacent spoke separated therefrom by said slot, and an annular integral rim formed integral with said spokes.

5. A rotor for dynamo-electric machines including an annular rim, spokes integral with said rim, a hub integral with said spokes and formed with a diametrical slot therein, means including a shaft for supporting said hub, a resilient arm formed integral with said hub adjacent said slot, and means clamping together said resilient arm and a spoke separated therefrom by said slot for securing said hub on said shaft.

ALEXANDER P. WOOD.